Patented Dec. 23, 1947

2,433,025

UNITED STATES PATENT OFFICE 2,433,025

LOW TEMPERATURE POLYMERIZATION PROCESS

John D. Calfee, Westfield, and Robert M. Thomas, Union, N. J., assignors to Standard Oil Development Company, a corporation of Delaware No Drawing. Application December 16, 1943, Serial No. 514,545

7 Claims. (Cl. 260—93)

This invention relates to low-temperature polymerization; relates particularly to the low-temperature polymerization of mixtures of isoolefins and polyolefins by the application thereto of Friedel-Crafts type catalysts in solution; and relates especially to means for controlling the catalyst operation.

It has been found possible to prepare a very valuable interpolymer by cooling mixtures of an isoolefin such as isobutylene with a polyolefin such as butadiene or isoprene or piperylene or dimethyl butadiene or dimethallyl or myrcene to temperatures ranging from about −10° C. to −100° C. or −160° C. and applying thereto a Friedel-Crafts catalyst in solution in a low-freezing, non-complex-forming solvent to yield a linear high-molecular-weight polymer of comparatively low unsaturation which is reactive with sulfur in a curing reaction, analogous, in some respects, to the vulcanizing of rubber. Difficulty is however encountered in conducting this reaction, especially as a continuous operation because of the fact that the catalyst forms complexes of unknown character during the continuous operation, which after the first rapid polymerization is completed, are conducive to the formation of low molecular weight polymer.

The present invention is based upon the discovery that if the catalyst complex is destroyed before it has reached a substantial amount, the addition of fresh catalyst will continue the polymerization of the reaction mixture to yield desirable polymer, and avoid the formation of the undesired types of polymer. Broadly, the invention consists in the addition to the polymerization mixture of small quantities of a catalyst neutralizer during the course of the polymerization reaction; the supply of reactants being continued and the supply of catalyst being continued or interrupted as desired during the addition of the catalyst neutralizer. The procedure of this invention thus neutralizes, in the reaction zone, catalyst complexes formed in the course of the polymerization, permitting all of the polymerization to be conducted by the influence of fresh catalyst in the substantial absence of catalyst complexes resulting from previous catalyst action.

The polymerization reaction of the invention thus is conveniently conducted by adding to the reaction mixture of isoolefin and polyolefin, in the presence of a slurry of solid polymer, if desired, and in the presence of fresh catalyst, if desired, of a catalyst-removing agent such as ammonia or a substituted ammonia of the amine type, or other convenient compound. Other objects and details of the invention will be apparent from the following description.

In practicing the invention, an olefinic mixture is prepared, preferably containing isobutylene as the isoolefin component, although other isoolefins such as 2-methyl butene-1 or 2-methyl pentene-1, or the like, may also be used. To the isoolefin there is then added a substantial amount of a polyolefin which may be conjugated or non-conjugated, as desired, or some compounds having more than two olefinic linkages may be used. Substantially any of the polyolefins having from 4 to 12 or 14 carbon atoms are usable in this reaction.

The reaction mixture is then preferably cooled to a temperature below −10° C., preferred temperatures lying from about −40° C. to about −103° C., although in some instances temperatures as low as approximately −160° C. may be used. The exact temperature is determined by several factors, among them the desired molecular weight, since the molecular weight is an inverse function of the polymerization temperature. The relative proportion of isoolefin and polyolefin may be varied over quite a wide range. About the minimum proportion of polyolefin is 0.25 parts; to 99.75 parts of isoolefin; and for most purposes it is preferable that the isoolefin be present in major proportion, and the polyolefin present in minor proportion. However, this is not a necessary requirement, since for some forms of polymer, amounts of polyolefin as high as 80% or 85% or even 90% with amounts of isoolefin from 20% to 15% or even 10% produce highly desirable interpolymers.

The reaction mixture may be cooled by such materials as liquid propane, solid carbon dioxide, liquid ethane, liquid ethylene, or even liquid methane, and the cooling may be accomplished by applying the refrigerant in the form of a refrigerating jacket, in which case the entire range of refrigerants is available, since the desired temperature may be obtained by the use of suction or pressure upon the refrigerating jacket. Or, the refrigerant may be added directly to the reaction mixture; such refrigerants as liquid propane, liquid or solid carbon dioxide, liquid ethane and liquid ethylene being particularly suitable for this method of cooling. An auxiliary diluent may also be used, if desired, especially when the reaction mixture is cooled by a refrigerating jacket. For this component of the reaction mixture such substances as ethyl or methyl chloride or methylene chloride, or dichlor-fluor methane or other alkyl halides, or carbon disulfide are particularly useful. In addition, however, various of the aliphatic hydrocarbons such as liquid butane, liquid propane, and the like, may also be used. In fact, substantially any of the lower mono or poly alkyl halides up to 4 or 5 carbon atoms are useful as well as the hydrocarbons which are liquid at the selected polymerization temperature.

The polymerization reaction is conducted by applying to the olefinic mixture a Friedel-Crafts type catalyst such as aluminum chloride, in solution in a low-freezing, non-complex-forming solvent such as a lower alkyl mono or poly halide, ethyl or methyl chloride, or methylene chloride being particularly suitable. Alternatively, a considerable range of other substances is usable including carbon disulfide and its analogues and homologues and various of the lower paraffin hydrocarbons, the latter being particularly useful when modified Friedel-Crafts halide catalysts are used.

For the Friedel-Crafts catalyst substantially any of the Friedel-Crafts catalysts disclosed by N. O. Calloway in his article on "The Friedel-Crafts synthesis" printed in the issue of "Chemical Review" published for the American Chemical Society at Baltimore in 1935, in Volume XVII, No. 3, the article beginning on page 327, the list being particularly well shown on page 375, may be used. The catalyst may be used as the straight normal halide, or it may be modified by the presence of related compounds such as hydrates, hydroxylates, alkylates, and the like, or double salts with two halogens such as the chloro bromide, or the like, these being particularly useful because of their relatively good solubility in the lower paraffin hydrocarbons.

The catalyst solution is preferably cooled to a temperature not too far from the polymerization temperature, and is then added to the olefinic mixture in any convenient way such as by spraying it in finely dispersed form on to the surface of the rapidly stirred olefinic mixture or by delivery in the form of a fine jet into a high turbulence zone in the rapidly stirred mixture or by other analogous methods which will be obvious to those skilled in the art; the requirement being that the catalyst solution be dispersed into the olefinic reaction mixture as rapidly as possible.

The polymerization reaction proceeds rapidly to yield a polymer which may have a molecular weight, or molecular weight number as determined by the Staudinger method, ranging from 25,000 or 30,000 up to 250,000 or above, preferred molecular weight numbers being within the range from about 35,000 to about 80,000, since products having weights below this range tend to be poorer in physical properties and weights above this range are more difficult to process for the production of cured articles. The polymer likewise may have an iodine number ranging from about 0.5 to 40 or 50 (as determined by the Wijs method).

This reaction is conveniently conducted in a reactor to which a continuing supply of the cold olefinic reaction mixture is delivered, and a slurry of solid polymer is allowed to overflow from the reactor, the solid polymer being removed, if desired, and the residual liquid being returned for further polymerization.

The polymerization begins promptly upon application of the catalyst and an excellent polymer product is obtained. However, at the end of a time interval which may be as short as five minutes or may be as great as several hours, but is usually approximately 30 minutes, particularly when the conversion of polymerizable material to polymer is high, the quality of polymer begins to deteriorate from the presence in the polymerization mixture of catalyst complexes formed from the catalyst previously introduced. Accordingly, at appropriate time intervals, there is introduced into the reaction mixture an appropriate catalyst neutralizing agent which may conveniently be ammonia, but may equally well be a substituted ammonia such as methyl amine or ethyl amine or propyl amine or di-ethyl amine or other analogous amines including such substances as phenyl beta naphthyl amine, urea, hexamethyl tetramine di-n-butyl-amine, beta naphthylamine, and the like. As far as present information goes, any substituted ammonia or amine is usable. The quantity added should be sufficient to destroy all dissolved catalyst, or catalyst complexes in the feed, and catalyst adsorbed on the surfaces of polymer particles. The amount of catalyst destroying agent required is determined by the amount of catalyst which has been carried out with the solid polymer as it is removed. Care should be taken to avoid the addition of an excess of catalyst neutralizer, since, if too much is added, an undue proportion of the fresh catalyst is neutralized before it has a chance to react with the polymerizable olefinic material. The catalyst neutralizer may be added in any convenient way. In the case of ammonia, the gaseous ammonia is simply bubbled into the polymerization mixture; or, it may be added as liquid ammonia, or it may be added in solution in a convenient carrier which may be liquid isobutylene or a portion of liquid feed mixture or a portion of fresh diluent or fresh refrigerant or any convenient solvent which is inert and harmless to the reaction mixture. In the case of the amines, they may be added in liquid form into the reaction mixture, or preferably they are dissolved in a small portion of diluent or refrigerant and added in solution to the reaction mixture. In any event a rapid stirring of the material is desirable to give a quick and effective dispersion of the catalyst neutralizer into the reaction mixture.

*Example 1*

A supply of feed mixture for the polymerization process was made up of isobutylene of 98% purity in the proportion of 97 parts by volume with 3 parts by volume of isoprene of 96% purity, and 150 parts by volume of methyl chloride of 99+% purity. The refrigerant jacketed reactor was filled with this mixture and cooled to approximately 98° C. to 103° C. by liquid ethylene in the reactor jacket and a continuing stream of feed mixture was delivered to the reactor, approximately 4 parts by volume of the feed mixture were supplied per minute to a 200 volume reactor. The contents of the reactor were stirred by a propeller stirrer operating at a speed of about 1750 R. P. M.; and the refrigerant jacket was kept nearly full of liquid ethylene. In order to conserve the refrigerant in the jacket, fresh feed was cooled by passage through a cooling coil submerged in the liquid ethylene just prior to delivery to the reactor. To the feed mixture in the reactor at a temperature of approximately −100° C. there was then added a continuous stream of catalyst solution consisting of 0.4% of anhydrous aluminum chloride dissolved in liquid methyl chloride, approximately 0.4 volumes of catalyst solution being delivered per minute into the reaction mixture through a 0.015 inch diameter delivery orifice. The catalyst solution was pre-cooled to a temperature of approximately −78° C. before delivery to the reactor by passage through a cooling coil submerged in a mixture of isopropyl alcohol and solid carbon dioxide.

The continuous delivery of fresh feed and catalyst resulted in the displacement of overflow liquid which was discharged continuously from the reactor through an overflow port near the top of the reaction vessel. The reaction liquid delivered from the reactor formed a slurry of solid polymer in diluent and unpolymerized olefinic material. This slurry, as delivered from the reactor, was thrown into a body of vigorously stirred hot water which served to vaporize unreacted components and diluent and to yield a slurry of solid polymer in water.

The solid polymer formed promptly upon the beginning of the delivery of catalyst solution to the reactor, and portions of it were carried over promptly into the overflow delivery. The polymer in the overflow material was found to be in the form of fine sandy grains well dispersed in the carrying liquid. The volatilized olefinic and diluent material discharged from the hot water tank were disposed of but normally they are particularly useful for recycling. When so treated, the mixture is preferably dehydrated to remove as much as possible of the water added in vapor form from the hot water in the quench tank, and the various components are then fractionally distilled and returned to storage. Alternatively, the overflow stream may be delivered to a strainer to remove the solid polymer, the liquid material separated being in some instances returned directly to the reaction zone, or, in suitable instances being recycled and purified; in this instance, purification being much simpler because of the absence of a drying problem. In any of these embodiments, the solid polymer is removed from the water, dried and prepared for further processing. In the present example, an excellent slurry of solid polymer, in good quantity, was discharged to the quench tank in 15 minutes or less from the time of beginning of delivery of catalyst.

Under the conditions of fixed flow of feed material and catalyst, as above described, it was found that the polymerization reaction proceeded smoothly for a period of approximately 25 minutes from the beginning of delivery of catalyst. After the elapse of approximately 25 minutes, control of the reaction was very nearly lost, as evidenced by the pronounced thickening of the contents of the reactor; the solid polymer then being formed at a much more rapid rate than during the first 25 minutes running. It is to be noted that the viscosity of the slurry is a function not of the amount of suspended solid polymer present therein but a function of the rate at which polymer is being produced. In the thick slurry, the rapid polymerization reaction caused a poor dispersion of the incoming feed and catalyst and caused the formation of hot spots in the neighborhood of growing polymer molecules because of the difficulty of maintaining rapid and efficient stirring and replacement of warmed diluent by fresh cold diluent. These factors resulted in the production of polymer at undesirably high temperatures and resulted in the production of relatively very poor polymer. It was found that this condition could be partly removed by discontinuing the catalyst flow for several minutes at approximately 5 minute intervals. This procedure decreased the viscosity of the reactor contents, showing that the reaction rate was reduced, but this procedure did not maintain the quality of the polymer.

Accordingly, at the end of 25 to 30 minutes, gaseous ammonia was bubbled through the reaction mixture in the reactor in an amount sufficient to react with substantially all of the catalyst present in the polymerization mixture. This was preferably done without interrupting the flow of catalyst solution or olefinic material feed. It did not substantially reduce the polymer content in the overflow slurry but it did reduce the viscosity of the mixture.

As a convenient means of determining the amount of ammonia to add, a small quantity of "National Oil Red" (a dyestuff formed by a diazotized coupling of azo xylene with beta naphthol) was added to the reaction mixture. This material was dissolved in methyl chloride and a small amount of the solution was added to the reactor prior to the addition of ammonia. This material is normally a good bright red but in the presence of active aluminum chloride catalyst, the color changes to blue. As long as there was active aluminum chloride catalyst present in the contents of the polymerization reactor, a blue tinge was given to the material by the dyestuff. The ammonia tended to change the color to red by destroying the active catalyst and when the blue tinge was gone and replaced by a faint reddish tinge, the delivery of ammonia was discontinued. The delivery of fresh catalyst was not interrupted nor was the delivery of fresh feed interrupted, and the time of addition of ammonia involved only a minute or two. The continuing delivery of fresh catalyst maintained the polymerization reaction for the formation of a highly satisfactory slurry. Obviously, the addition of excess ammonia is undesirable, since the excess destroys incoming fresh catalyst material. Ordinarily, not more than about 2 or 3 mols of ammonia were added per mol of active catalyst present.

The polymerization reaction was continued for a time interval of 24 hours during which a steady feed of mixed olefinic material and diluent was maintained and a steady feed of catalyst solution, with small quantities of ammonia sufficient to deactivate residual catalyst added at approximately 30-minute intervals. It was noted that the polymer produced in the last 30 minutes of this 24-hour run was of the same quality as the polymer produced in the first 30 minutes of the run. Evaluation of polymer at the beginning, during the run, and at the end, showed that the product was of very excellent quality, having a Mooney plasticity at 100° C. of 75 and a tensile strength, after curing with sulfur in the presence of tetramethyl thiuram disulfide better than 3000 pounds per square inch.

*Example 2*

A similar run was made as in Example 1, adding ammonia, as in Example 1, at half-hour intervals over a period of approximately 5½ hours, to make sure that the run was in every respect the same as in Example 1. The addition of ammonia was then discontinued and over a period of 3½ hours, the Mooney plasticity value dropped from 75 to about 30. At the same time, the tensile strength of the product (after a 60 minute cure at 307° F. with sulfur and Tuads) dropped rapidly from about 3000 pounds per square inch to about 500 pounds per square inch. Ammonia treatments each 30 minutes were then resumed at the ninth hour of the run. After 8 ammonia treatments at half-hour intervals the Mooney plasticity number of the resulting product had increased to about 48, and the tensile strength value had increased to about 2300 pounds per square inch. The run was terminated at this point because of lack of farther feed material.

*Example 3*

A similar run to Example 1 was conducted but, instead of ammonia, di-n-butyl amine in solution in methyl chloride was used and substantially the same results were obtained; satisfactory operation of the reaction being obtained readily and a similar high-grade polymer being obtained throughout the run.

*Example 4*

A similar run was conducted using beta naphthyl amine and similar results were obtained showing that the amines generally were satisfactory as well as the ammonia.

A series of 15 polymerizations was conducted according to this procedure and results were obtained according to the subjoined Tables I and II.

Table I

| Run No. | Duration of Run in Hours | Feed B— | Feed Rate ccs. per min. | Diluent Ratio | Catalyst Conc. | Catalyst Source of MeCl | Catalyst Rate ccs. per min. | Catalyst How added | Ammonia Addition | Reason for Shut down | Slurry gms./100 cc. Aver. | Slurry gms./100 cc. Max. |
|---|---|---|---|---|---|---|---|---|---|---|---|---|
| 1 | 2.5 | 1.45 | 375 | 1.5:1 | 0.4 | Plant scrubbed. | 55 | .011″ dia. jet 1″ above liquid surface. | Every 30 minutes. | Lump on propeller. | 9.5 / 10.5 | 10.5 / 12.0 |
| 2 | 2.5 | 1.45 | 375 | 1.5:1 | 0.4 | ...do... | 55 | ...do... | ...do... | Surging due to lump on propeller. | 15.0 / 16.0 / 15.0 / 12.0 | 17.0 / 18.5 / 17.0 / 15.0 |
| 3 | 1.5 | 3 | 240–375 | 1.5:1 | 0.4 | ...do... | 55 | ...do... | ...do... | ...do... | 5.5 / 11.0 | 6.0 / 12.5 |
| 4 | 3.5 | 3 | 300 | 1.5:1 | 0.4 | ...do... | 55 | ...do... | ...do... | ...do... | 11.0 | 14.0 |
| 5 | 1.75 | 3 | 300 | 1.5:1 | 0.55 | ...do... | 55 | .011″ dia. jet below liquid level. | ...do... | ...do... | 10.0 / 10.0 | 10.0 / 13.5 |
| 6 | 1.5 | 3 | 460 | 1.5:1 | 0.55 | ...do... | 55 | .011″ dia. jet 1″ above liq. level. | ...do... | ...do... | 11.0 | 14.0 |
| 7 | 5 | 3 | 375 | 1.5:1 | 0.4 | ...do... | 55 | ...do... | ...do... | Lack of operators. | 10.0 / 19.0 / 13.0 / 12.0 | 13.0 / 11.0 / 15.7 / 13.5 |
| 8 | 12 | 3 | 375 | 1.5:1 | 0.4 | ...do... | 55 | ...do... | ...do... | ...do... | 9.0 / 13.0 | 16.6 / 16.2 |
| 9 | 25.5 | 3 | 375 | 1.5:1 | 0.4 | ...do... | 50 | ...do... | ...do... | ...do... | 19.0 / 13.0 | 23.6 / 14.6 |
| 10 | 15.75 | 3 | 375–460 | 1.5:1 | 0.4 | ...do... | 50 | ...do... | ...do... | ...do... | [1]14.0 | 18.3 |
| 11 | 4.6 | 3 | 300–460 | 1.5:1 | 0.4 | ...do... | 50 | ...do... | ...do... | No ethylene. | 17.5 | 19.9 |
| 12 | 2.6 | 3 | 375 | 1.5:1 | 0.4 | ...do... | 50 | ...do... | ...do... | Out of cat. and feed. | 13.0 / 15.0 | 21.0 / 16.4 |
| 13 | 3 | 3 | 375 | 1.5:1 | 0.4 | Tank car unscrubbed. | 50 | ...do... | ...do... | No operators. | 6.0 | 10.0 |
| 14 | 4 | 3 | 330 | 1.2:3 | 0.4 | ...do... | 55 | ...do... | ...do... | Could not maintain slurry. | ------ | 11.0 |
| 15 | 13.75 | 3 | 375 | 1.5:1 | 0.4 | ...do... | 55 | ...do... | Every 30 min. to Hour 5. None to Hour 11.5. Every 30 min. to end. | Out of feed. | 13 / 18 / 17.5 / 17 / 18 / 15 / 15 | 16.4 / 20.8 / 20.3 / 17.1 / 20 / 81.6 / 16 |

[1] Two jets.

Table II

| Run No. | Cuts No. | Cuts Hour taken | Cuts Spread | Mooney Viscosity | Goodrich Flexometer Heat build-up | Goodrich Flexometer Drift | 10 Parts Black 20′ Tens. | 10 Parts Black 40′ Tens. | 10 Parts Black 60′ Tens. | 50 Parts Black 20′ Mod. | 50 Parts Black 20′ Tens. | 50 Parts Black 40′ Mod. | 50 Parts Black 40′ Tens. | 50 Parts Black 60′ Mod. | 50 Parts Black 60′ Tens. |
|---|---|---|---|---|---|---|---|---|---|---|---|---|---|---|---|
| 1 | 1 | 1 | 64 min | 79 | 34.6 | .021 | 2,860 | 3,400 | 3,450 | ------ | 3,000 | ------ | 2,950 | 580 | 3,150 |
| 1 | 2 | 2 | 74 min | 80 | 35.6 | .027 | 2,500 | 3,350 | 3,400 | ------ | 3,000 | ------ | 3,000 | 570 | 3,000 |
| 1 | 3 | End | 10 min | 82 | 34.3 | .030 | 2,550 | 3,400 | 3,400 | ------ | 3,250 | ------ | 3,100 | 389 | 3,250 |
| 2 | 1 | 1 | 77 min | 60 | 43.5 | .018 | 2,400 | 2,900 | 3,100 | ------ | 2,800 | ------ | 2,900 | 450 | 2,900 |
| 2 | 2 | 1.6 | 26 min | 49 | 42.2 | (?).232 | 2,200 | 3,000 | 3,200 | ------ | 2,600 | ------ | 2,800 | 475 | 2,800 |
| 2 | 3 | 2 | 17 min | 53 | 40.3 | .043 | 2,200 | 3,000 | 3,300 | ------ | 2,500 | ------ | 2,800 | 450 | 2,750 |
| 2 | 4 | End | 32 min | 54 | 36.3 | .038 | 2,500 | 3,400 | 3,400 | ------ | 2,700 | ------ | 2,800 | 525 | 2,900 |
| 3 | 1 | 1.8 | 100 min | 73 | | | 2,300 | 3,400 | 3,500 | 675 | 2,500 | 1,050 | 2,600 | 1,200 | 2,650 |
| 3 | 2 | End | 55 min | 75 | | | 2,500 | 3,100 | 3,600 | 625 | 2,600 | 1,100 | 2,550 | 1,100 | 2,650 |
| 4 | 1 | .25 | 15 min | 77 | 29.2 | .013 | 2,900 | 2,850 | 2,850 | 375 | 3,050 | 650 | 3,100 | 650 | 3,250 |
| 4 | 2 | 1 | 45 min | 71 | 29.4 | .011 | 3,450 | 3,350 | 3,200 | 280 | 2,900 | 475 | 3,050 | 575 | 3,150 |
| 4 | 3 | End | 126 min | 72 | 27.4 | .020 | 3,450 | 3,700 | 3,400 | 240 | 2,950 | 450 | 2,950 | 500 | 3,100 |
| 5 | 1 | 2.5 | 153 min | 60 | 38.3 | (?).128 | 2,700 | 2,650 | 2,250 | 438 | 2,800 | 700 | 2,850 | 925 | 2,800 |
| 5 | 4 | End | 67 min | 44 | 32.2 | .041 | 2,100 | 2,200 | | 375 | 2,300 | 580 | 2,550 | 775 | 2,700 |
| 6 | 1 | .7 | 47 min | 62 | 35.7 | .019 | 3,000 | 3,000 | 2,500 | 520 | 2,950 | 725 | 2,700 | 800 | 2,850 |
| 6 | 3 | End | 18 min | 59 | 35.0 | .022 | 2,950 | 2,600 | 2,400 | 500 | 2,850 | 725 | 2,900 | 775 | 2,900 |
| 7 | 1 | 1 | 60 min | 42 | 31.8 | .014 | 3,000 | 2,600 | 1,950 | 500 | 2,900 | 700 | 2,900 | 900 | 2,900 |
| 7 | 5 | End | 60 min | 53 | 31.8 | .056 | 3,000 | 2,400 | 1,400 | 500 | 2,900 | 700 | 2,900 | 850 | 2,850 |
| 8 | 1 | 2.75 | 165 min | 44 | | | 2,990 | 2,320 | 2,080 | 360 | 2,780 | 580 | 2,790 | 580 | 2,720 |
| 8 | 5 | End | 120 min | 50 | | | 3,100 | 2,510 | 2,020 | 580 | 2,830 | 735 | 2,750 | 845 | 2,710 |
| 9 | 1 | 2 | 114 min | 48 | | | 3,120 | 2,330 | 1,440 | 370 | 2,810 | 635 | 2,860 | 750 | 2,540 |
| 9 | 5 | 10.3 | 97 min | 55 | | | 2,620 | 2,270 | 1,400 | 570 | 2,840 | 690 | 2,850 | 820 | 2,800 |
| 9 | 9 | 19 | 105 min | 34 | | | 2,230 | 1,980 | 670 | 550 | 2,740 | 695 | 2,630 | 920 | 2,670 |
| 10 | 1 | 7 | 7 hours | 41 | | | 2,790 | 2,850 | 2,700 | 295 | 2,550 | 340 | 2,680 | 440 | 2,720 |
| 10 | 2 | 11 | 4 hours | 48 | | | 2,800 | 2,580 | 2,500 | 270 | 2,570 | 480 | 2,570 | 620 | 2,770 |
| 11 | 2 | 2 | 120 min | 56 | | | 2,840 | 2,950 | 3,010 | 390 | 2,710 | 620 | 2,810 | 810 | 2,830 |
| 12 | 3 | 7 | 2 hours | 53 | | | 3,030 | 3,130 | 2,340 | 410 | 2,820 | 605 | 2,660 | 770 | 2,650 |
| 12 | 21 | 5 hours | | 51 | | | 2,910 | 2,790 | 2,570 | 540 | 2,580 | 790 | 2,710 | 1,035 | 2,650 |
| 13 | 2 | End | 50 min | 50 | | | 2,990 | 2,700 | 2,690 | 370 | 2,680 | 650 | 3,000 | 670 | 2,950 |
| 14 | 2 | End | 150 min | 66 | | | 1,700 | 780 | 580 | 865 | 2,800 | 1,215 | 2,730 | 1,380 | 2,700 |
| 15 | 1 | 2 | 120 min | 69 | | | 3,250 | 3,200 | 2,960 | 400 | 3,050 | 545 | 3,060 | 680 | 3,080 |
| 15 | 2 | 5.5 | 210 min | 74 | | | 2,910 | 2,860 | 2,870 | 260 | 2,670 | 500 | 3,080 | 620 | 3,130 |
| 15 | 3 | 7.5 | 120 min | 50 | | | 2,960 | 2,830 | 2,420 | 350 | 2,770 | 570 | 2,820 | 700 | 2,784 |
| 15 | 4 | 8.5 | 60 min | 39 | | | 1,770 | 2,790 | 830 | 415 | 2,440 | 640 | 2,440 | 715 | 2,430 |
| 15 | 5 | 9.5 | 60 min | 33 | | | 2,160 | 1,750 | 520 | 375 | 2,220 | 550 | 2,500 | 685 | 2,490 |
| 15 | 6 | 12 | 150 min | 31 | | | 1,960 | 2,150 | 1,280 | 280 | 2,180 | 460 | 2,390 | 540 | 2,430 |
| 15 | 7 | 13.75 | 105 min | 43 | | | 2,320 | 2,240 | 2,170 | 360 | 2,730 | 565 | 2,630 | 580 | 2,550 |
| 15 | 8 | End | In reactor | 46 | | | 2,810 | 2,630 | 2,240 | 300 | 2,680 | 480 | 2,680 | 570 | 2,680 |

These results show a substantial improvement over prior operating procedures and show an excellent yield of high-grade polymer and the capability of maintaining continuous operation of the reactor.

Thus the process of the invention consists broadly of the addition to a continuous low temperature olefinic polymerization reaction of successive small quantities of a catalyst deactivating agent. The addition of the agent appears to neutralize slow acting dissolved catalyst and residual catalyst complex material present in the reaction mixture. The destruction of such catalytic materials permits the formation of excellent quality material upon introduction of fresh catalyst.

Thus the process of the present invention neutralizes the catalyst in a continuous polymerization reaction to prevent the existence within the polymerization mixture of any catalyst or catalyst complex having a total life of more than a very limited time interval, thereby preventing the building up of any substantial quantity of unduly old catalyst and avoiding the formation of more than traces of low molecular weight polymer resulting from the presence of old catalyst or catalyst complexes.

The invention claimed is:

1. In a continuous low temperature process for the copolymerization of an isobutylene containing material comprising a major proportion of isobutylene and a minor proportion of a conjugated diolefin having from 4 to 10 inclusive, carbon atoms per molecule at a temperature within the range between −10° C. and −160° C., by the application thereto of a polymerization catalyst comprising aluminum chloride in solution in an aliphatic halide having a carbon atom number within the range between 1 and 2 inclusive, by the mixing of continuing streams of isobutylene-diolefin mixture and catalyst solution for the polymerization reaction, the step of adding to the combined isobutylene-diolefin-catalyst mixture, at intervals of from 5 to 30 minutes, an amount of ammonia within the range of 2 to 3 mols per mole of aluminum chloride present in the reaction mixture sufficient to destroy substantially all catalyst and catalyst complexes, without the addition of an excess, without interruption of the stream of isobutylene-diolefin-catalyst mixture, without significant rise in mixture temperature; and without interrupting the polymerization reaction; the addition of ammonia being completed within a time interval of a small number of minutes, the frequency of addition of ammonia being determined by the thickness of overflow material from the polymerization reaction.

2. In a continuous low temperature process for the copolymerization of an isobutylene containing material comprising a major proportion of isobutylene and a minor proportion of a conjugated diolefin having from 4 to 10 inclusive, carbon atoms per molecule at a temperature within the range between −10° C. and −160° C., by the application thereto of a polymerization catalyst comprising aluminum chloride in solution in an aliphatic halide having a carbon atom number within the range between 1 and 2 inclusive, by the mixing of continuing streams of isobutylene-diolefin mixture and catalyst solution for the polymerization reaction, the step of adding to the combined isobutylene-diolefin-catalyst mixture, at intervals of from 5 to 30 minutes, an amount of a trivalent nitrogen compound selected from the group consisting of ammonia, beta naphthyl amine, and di-normal butyl amine in an amount within the range of 2 to 3 mols per mol of aluminum chloride present in the reaction mixture; sufficient to destroy substantially all catalyst and catalyst complexes, without the addition of an excess, without interruption of the stream of isobutylene-diolefin-catalyst mixture, without significant rise in mixture temperature; and without interrupting the polymerization reaction; the addition of the trivalent nitrogen compound being completed within a time interval of a small number of minutes, the frequency of addition of the trivalent nitrogen compound being determined by the thickness of overflow material from the polymerization reaction.

3. In a continuous low temperature process for the copolymerization of an isobutylene containing material comprising a major proportion of isobutylene and a minor proportion of a conjugated diolefin having from 4 to 10 inclusive, carbon atoms per molecule at a temperature within the range between −10° C. and −160° C., by the application thereto of a polymerization catalyst comprising aluminum chloride in solution in an aliphatic halide having a carbon atom number within the range between 1 and 2 inclusive, by the mixing of continuing streams of isobutylene-diolefin mixture and catalyst solution for the polymerization reaction, the step of adding to the combined isobutylene-diolefin-catalyst mixture, at intervals of from 5 to 30 minutes, an amount of beta naphthyl amine within the range of 2 to 3 mols per mole of aluminum chloride present in the reaction mixture; sufficient to destroy substantially all catalyst and catalyst complexes, without the addition of an excess, without interruption of the stream of isobutylene-diolefin-catalyst mixture, without significant rise in mixture temperature; and without interrupting the polymerization reaction; the addition of the beta naphthyl amine being completed within a time interval of a small number of minutes, the frequency of addition of the beta naphthyl amine being determined by the thickness of overflow material from the polymerization reaction.

4. In a continuous low temperature process for the copolymerization of an isobutylene containing material comprising a major proportion of isobutylene and a minor proportion of a conjugated diolefin having from 4 to 10 inclusive, carbon atoms per molecule at a temperature within the range between −10° C. and −160° C., by the application thereto of a polymerization catalyst comprising aluminum chloride in solution in an aliphatic halide having a carbon atom number within the range between 1 and 2 inclusive, by the mixing of continuing streams of isobutylene-diolefin mixture and catalyst solution for the polymerization reaction, the step of adding to the combined isobutylene-diolefin-catalyst mixture, at intervals of from 5 to 30 minutes, an amount of di-n-butyl-amine within the range of 2 to 3 mols per mole of aluminum chloride present in the reaction mixture; sufficient to destroy substantially all catalyst and catalyst complexes, without the addition of an excess, without interruption of the stream of isobutylene-diolefin-catalyst mixture, without significant rise in mixture temperature; and without interrupting the polymerization reaction; the addition of di-n-butyl-amine being completed within a time interval of a small number of minutes, the frequency of addition of di-n-butyl-amine being determined by the thickness of overflow material from the polymerization reaction.

5. In a continuous low temperature process for the copolymerization of an isobutylene containing material comprising a major proportion of isobutylene and a minor proportion of butadiene at a temperature within the range between −10° C. and −160° C., by the application thereto of a polymerization catalyst comprising aluminum chloride in solution in an aliphatic halide having a carbon atom number within the range between 1 and 2 inclusive, by the mixing of continuing streams of isobutylene-diolefin mixture and catalyst solution for the polymerization reaction, the step of adding to the combined isobutylene-diolefin-catalyst mixture, at intervals of from 5 to 30 minutes, an amount of ammonia within the range of 2 to 3 mols per mole of aluminum chloride present in the reaction mixture; sufficient to destroy substantially all catalyst and catalyst complexes, without the addition of an excess, without interruption of the stream of isobutylene-diolefin-catalyst mixture, without significant rise in mixture temperature, and without interrupting the polymerization reaction; the addition of ammonia being completed within a time interval of a small number of minutes, the frequency of addition of ammonia being determined by the thickness of overflow material from the polymerization reaction.

6. In a continuous low temperature process for the copolymerization of an isobutylene containing material comprising a major proportion of isobutylene and a minor proportion of isoprene at a temperature within the range between −10° C. and −160° C., by the application thereto of a polymerization catalyst comprising aluminum chloride in solution in an aliphatic halide having a carbon atom number within the range between 1 and 2 inclusive, by the mixing of continuing streams of isobutylene-diolefin mixture and catalyst solution for the polymerization reaction, the step of adding to the combined isobutylene-diolefin-catalyst mixture, at intervals of from 5 to 30 minutes, an amount of ammonia within the range of 2 to 3 mols per mole of aluminum chloride present in the reaction mixture; sufficient to destroy substantially all catalyst and catalyst complexes, without the addition of an excess, without interruption of the stream of isobutylene-diolefin-catalyst mixture, without significant rise in mixture temperature; and without interrupting the polymerization reaction; the addition of ammonia being completed within a time interval of a small number of minutes, the frequency of addition of ammonia being determined by the thickness of overflow material from the polymerization reaction.

7. In a continuous low temperature process for the copolymerization of an isobutylene containing material comprising a major proportion of isobutylene and a minor proportion of dimethyl butadiene at a temperature within the range between −10° C. and −160° C. by the application thereto of a polymerization catalyst comprising aluminum chloride in solution in an aliphatic halide having a carbon atom number within the range between 1 and 2 inclusive, by the mixing of continuing streams of isobutylene-diolefin mixture and catalyst solution for the polymerization reaction, the step of adding to the combined isobutylene-diolefin-catalyst mixture at intervals of from 5 to 30 minutes, an amount of ammonia within the range of 2 to 3 mols per mole of aluminum chloride present in the reaction mixture; sufficient to destroy substantially all catalyst and catalyst complexes, without the addition of an excess, without interruption of the stream of isobutylene-diolefin-catalyst mixture, without significant rise in mixture temperature; and without interrupting the polymerization reaction; the addition of ammonia being completed within a time interval of a small number of minutes, the frequency of addition of ammonia being determined by the thickness of overflow material from the polymerization reaction.

JOHN D. CALFEE.
ROBERT M. THOMAS.

REFERENCES CITED

The following references are of record in the file of this patent:

UNITED STATES PATENTS

| Number | Name | Date |
|---|---|---|
| 2,300,069 | Skooglund | Oct. 27, 1942 |
| 2,291,510 | Thomas | July 28, 1942 |
| 2,139,038 | Russell | Dec. 6, 1938 |
| 2,296,399 | Otto | Sept. 22, 1942 |
| 2,344,213 | Otto | Mar. 14, 1944 |

FOREIGN PATENTS

| Number | Country | Date |
|---|---|---|
| 483,453 | Great Britain | Apr. 20, 1938 |